US008810965B2

(12) United States Patent
Peng et al.

(10) Patent No.: US 8,810,965 B2
(45) Date of Patent: Aug. 19, 2014

(54) MAGNETIC HEAD, HEAD GIMBAL ASSEMBLY AND DISK DRIVE UNIT WITH THE SAME, AND MANUFACTURING METHOD THEREOF (71) Applicant: SAE Magnetics (H.K) Ltd., Hong Kong (CN)

(72) Inventors: Li ping Peng, GuangDong (CN); Shen kuang Sidney Chou, Hong Kong (CN); Chi hung Yuen, Hong Kong (CN); Yan bin Wang, GuangDong (CN); Lu Xiao, GuangDong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/770,245

(22) Filed: Feb. 19, 2013

(65) Prior Publication Data
US 2014/0198411 A1 Jul. 17, 2014

(30) Foreign Application Priority Data

Jan. 14, 2013 (CN) .......................... 2013 1 0013505

(51) Int. Cl.
G11B 5/60 (2006.01)
G11B 5/127 (2006.01)

(52) U.S. Cl.
CPC ..................................... G11B 5/127 (2013.01)
USPC ..................................................... 360/234.5

(58) Field of Classification Search
CPC ...... G11B 5/48; G11B 5/4826; G11B 5/4853; G11B 21/21; G11B 5/3103
USPC .................................. 360/234.5, 235.7, 236.5
See application file for complete search history.

(56) References Cited

U.S. PATENT DOCUMENTS

| 6,828,677 | B2 * | 12/2004 | Yap et al. ....................... 257/737 |
| 8,295,011 | B2 * | 10/2012 | Chou et al. ................. 360/234.5 |
| 8,320,081 | B2 * | 11/2012 | Chou et al. ................. 360/234.5 |
| 8,351,158 | B2 * | 1/2013 | Zhu et al. ................... 360/234.5 |
| 2006/0221501 | A1 * | 10/2006 | Sato et al. ................... 360/234.5 |
| 2007/0274005 | A1 * | 11/2007 | Zhu et al. ................... 360/234.4 |
| 2010/0180430 | A1 * | 7/2010 | Roskos ......................... 29/602.1 |
| 2011/0149423 | A1 * | 6/2011 | Lasfargues et al. ........... 359/883 |
| 2011/0157750 | A1 * | 6/2011 | Zhu et al. ................... 360/245.8 |
| 2011/0193218 | A1 * | 8/2011 | Arvin et al. ................... 257/737 |
| 2011/0194209 | A1 * | 8/2011 | Chou et al. ................. 360/246.4 |

* cited by examiner

Primary Examiner — Will J Klimowicz
(74) Attorney, Agent, or Firm — Nixon & Vanderhye PC (57) ABSTRACT A magnetic head includes a slider substrate having a trailing edge and multiple bonding pads arranged on the trailing edge in a row. Each of the bonding pads includes a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer. The structure of the magnetic head is simple and stable, which can prevent the bonding pads bridging and shorting-circuit. An HGA and a disk drive unit with the same, a manufacturing method for the magnetic head are also disclosed.

21 Claims, 11 Drawing Sheets

MAGNETIC HEAD, HEAD GIMBAL ASSEMBLY AND DISK DRIVE UNIT WITH THE SAME, AND MANUFACTURING METHOD THEREOF

FIELD OF THE INVENTION

The present invention relates in general to information recording disk drive, and more particularly to a magnetic head, a head gimbal assembly (HGA) and a disk drive unit with the same, and a manufacturing method of a magnetic head.

BACKGROUND OF THE INVENTION

Hard disk drives are common information storage devices. Typically, referring to FIG. 1a, a disk drive unit 1' contains a number of rotatable magnetic disks 15' mounted on a spindle motor 17', and a head stack assembly (HSA) 13' which is rotatable about an actuator arm axis for accessing data tracks on the magnetic disks 15' during seeking. The HSA 13' includes at least one drive arm 131' and HGA 132'. Typically, a spindling voice-coil motor (VCM) (not labeled) is provided for controlling the motion of the drive arm 131'.

Figure 1A:
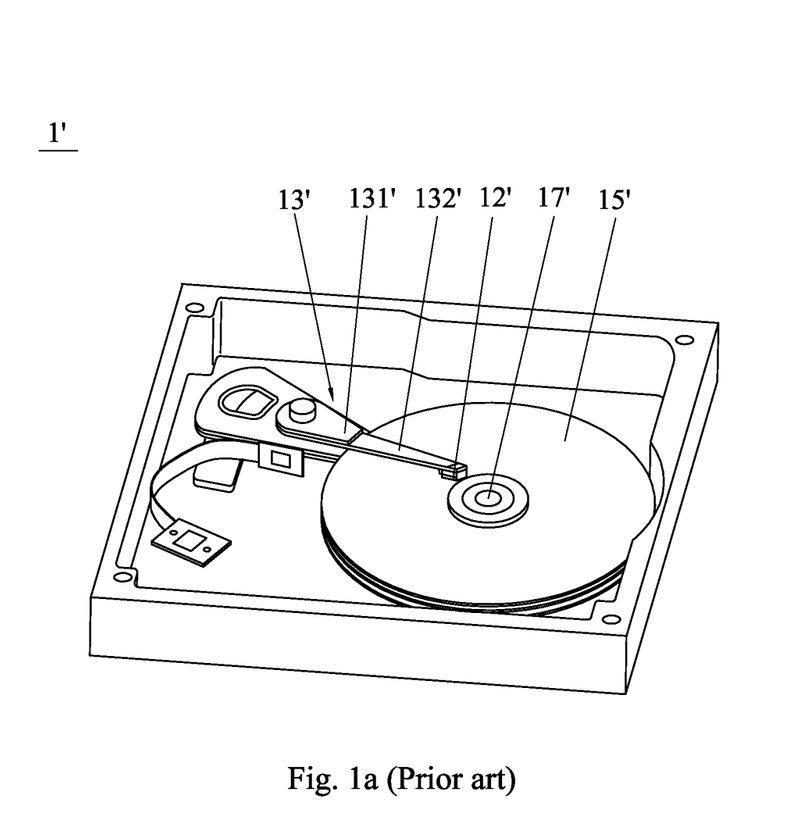
FIG. 1a is a perspective view of a conventional disk drive unit.
Figure 1B:
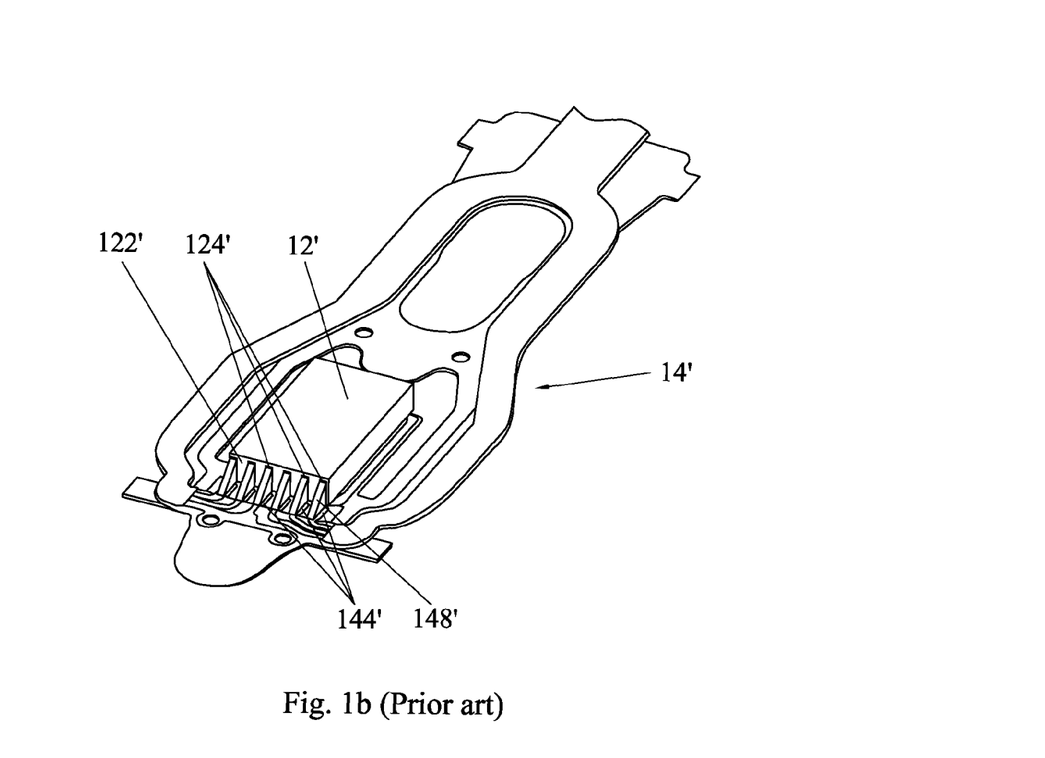
FIG. 1b is a partial perspective view of an HGA with a conventional magnetic head.

Referring to FIGS. 1a and 1b, the HGA 132' includes a floating magnetic head 12' that can read data from magnetic media or write to selectively and a suspension 14' to load or suspend the magnetic head 12' thereon. When the hard disk drive is on, the spindle motor 17' will rotate the disk 15' at a high speed, and the magnetic head 12' will fly above the disk 15' due to the air pressure drawn by the rotated disk 15'. The magnetic head 12' moves across the surface of the disk 15' in the radius direction under the control of the VCM. With a different track, the magnetic head 12' can read data from or write data to the disk 15'.

Figure 1C:
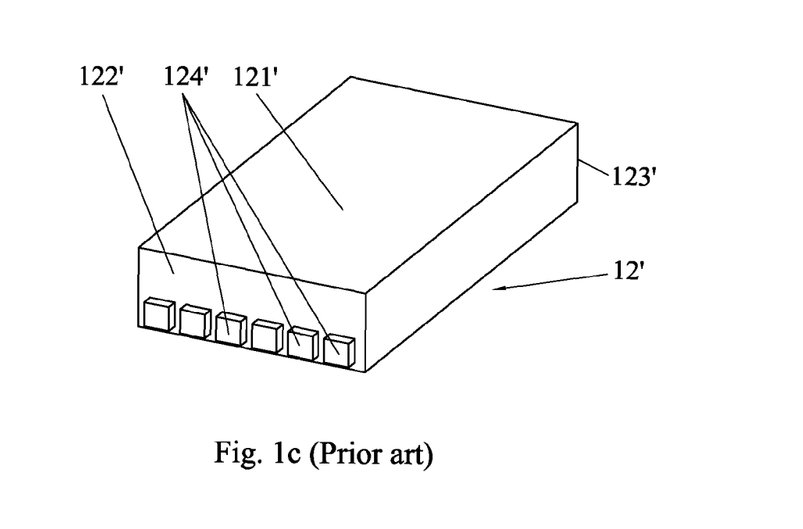
FIG. 1c is a perspective view of the magnetic head shown in FIG. 1b.
Figure 1D:
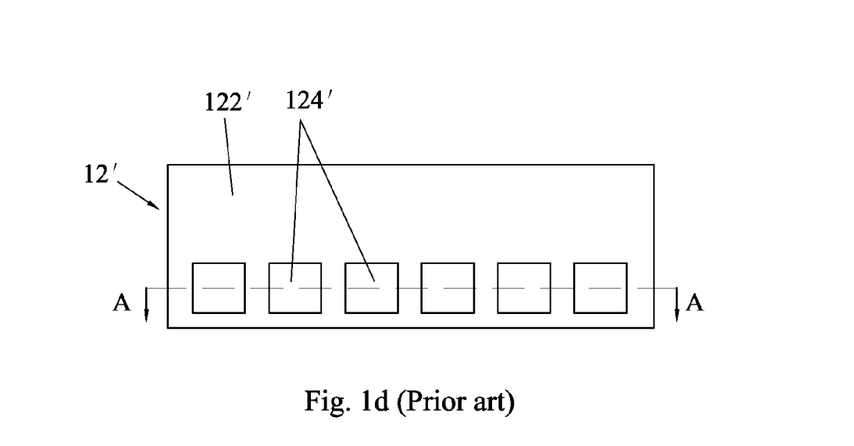
FIG. 1d is a side view of the magnetic head shown in FIG. 1c seen from the trailing edge.
Figure 1E:
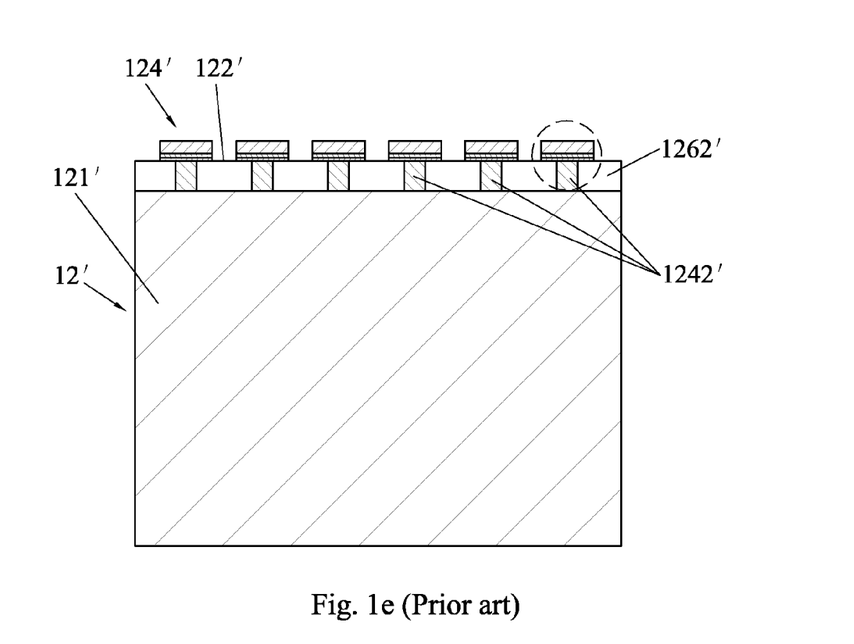
FIG. 1e is a cross-section view of the magnetic head along line A-A indicated in FIG. 1d.
Figure 1F:
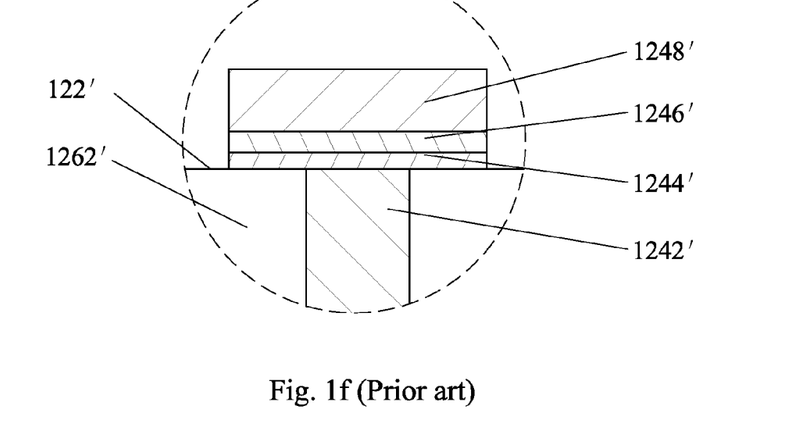
FIG. 1f is a partial enlarged view of the magnetic head as shown in FIG. 1e.

As shown in FIGS. 1b and 1c, the magnetic head 12' includes a slider substrate 121' having a trailing edge 122' and a leading edge 123', and a pole tip with a read/write element (not shown) embedded in the trailing edge. As illustrated in FIG. 1c, a plurality of bonding pads 124' are arranged on the trailing edge 122' and adapted for connecting to the electrical connection pads 144' of the suspension 14' by the way of solder joints 148'. Owing to the limitation of the size of the magnetic head 12', the number of the bonding pads 124' located on the trailing edge 122' generally is six or eight, a pair of bonding pads 124' are electrically connected to a read element for reading data from magnetic disk, a pair of bonding pads 124' are electrically connected to a write element for writing data to magnetic disk, a pair of bonding pads 124' are electrically connected to a thermal resistance for heating the pole tip, a pair of bonding pads 124' are electrically connected to a sensor for adjusting the flying height of the magnetic head 12' by means of inducting the interaction between the magnetic head 12' and the magnetic disk 15'. With increased demand of data storage for capacity of disk drive unit 1', the capacity of disk drive unit 1' has always been the focus of research. But in recent years, higher request for the reliability of the magnetic head 12' has also been put forward. The magnetic head 12' as the core of the disk drive unit 1' is used to read and write data message, the capacity of disk drive unit 1' is determined by flying height and lubricating property of magnetic head 12', and surface condition of magnetic head 12' and magnetic disk 15', while the reliability of the bonding pads 124' markedly affect the reliability of the magnetic head, and further affect the reliability of the disk drive unit.

As shown in FIG. 1c-1f, the slider substrate 121' further includes an over coat layer 1262' having the trailing edge 122' on which the bonding pads 124' formed. Several copper columns 1242' are buried in an over coat layer 1262' for connecting with read/write element in the slider substrate 121' and connecting with the bonding pads 124'. Each bonding pad 124' contains a titanium or tantalum layer 1244' formed on the trailing edge 122' and connected to the copper column 1242', a ferro-nickel layer 1246' formed on the titanium or tantalum layer 1244' and a gold layer 1248' formed on the ferro-nickel layer 1246' for soldering. Due to small distance between two adjacent bonding pads, the adjacent bonding pads are prone to shorting-circuit during soldering process, thus damage the magnetic head. In order to meet the needs of the test, the dimension of the bonding pads should match the size of the tester probe, and because of small magnetic head dimension, it's difficult for the magnetic head to carry more bonding pads with additional function at its trailing edge, thereby limiting the function and performance of the magnetic head.

Hence, it is desired to provide a magnetic head, an HGA, and a disk drive unit to overcome the above-mentioned drawbacks.

SUMMARY OF THE INVENTION

One objective of the present invention is to provide a magnetic head with simple and stable structure, which can prevent the bonding pads bridging and shorting-circuit.

Another objective of the present invention is to provide a manufacturing method for a magnetic head, which has simple and stable structure, and can prevent the bonding pads bridging and shorting-circuit.

Yet one objective of the present invention is to provide an HGA with a magnetic head, which has simple and stable structure, and can prevent the bonding pads bridging and shorting-circuit.

Still one objective of the present invention is to provide a disk drive unit with a magnetic head, which has simple and stable structure, and can prevent the bonding pads bridging and shorting-circuit.

To achieve above objectives, a magnetic head contains a slider substrate having a trailing edge and multiple bonding pads arranged on the trailing edge in a row, each of the bonding pads includes a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer.

As an embodiment of the present invention, the seed layer has the same width with the soldering layer.

Preferably, the solder nonwettable layer has the same thickness with the seed layer.

As another embodiment of the present invention, the solder nonwettable layer has a thickness larger than that of the seed layer.

Preferably, the slider substrate further contains an over coat layer having the trailing edge, and the seed layer electrically connects with a copper column embedded in the over coat layer.

As yet another embodiment of the present invention, each of the bonding pads further contains an enhancing layer sandwiched between the seed layer and the soldering layer.

As still another embodiment of the present invention, the seed layer and the solder nonwettable layer are formed integrally, the structure is simple, and the production cost is low.

As another embodiment of the present invention, a first solder nonwettable layer and a second solder nonwettable layer are connected with two sides of the seed layer respectively to prevent adjacent bonding pads from shorting-circuit.

Preferably, the seed layer contains one or more material(s) selected from nickel, titanium, tantalum, aluminum, nickel alloy, titanium alloy, tantalum alloy, aluminum alloy, or Diamond-like Carbon.

Preferably, the solder nonwettable layer contains one or more material(s) selected from nickel, titanium, tantalum, aluminum, nickel alloy, titanium alloy, tantalum alloy, aluminum alloy, or Diamond-like Carbon.

Preferably, the enhancing layer contains one or more material(s) selected from nickel, titanium, tantalum, aluminum, nickel alloy, titanium alloy, tantalum alloy, aluminum alloy, or Diamond-like Carbon.

Preferably, at least eight bonding pads are arranged on the trailing edge, these additional bonding pads could be connected to some elements with specific functions, thus the magnetic head could achieve more functions, further improve the read and write performance of magnetic head.

A manufacturing method for forming bonding pads on a slider substrate, including steps of:

(1) providing a slider substrate with a trailing edge;
(2) forming multiple seed layers on the trailing edge in a row;
(3) forming a soldering layer on the seed layers; and
(4) forming at least one solder nonwettable layer on the trailing edge and connecting with at least one side of the seed layer.

An HGA of the present invention contains a magnetic head and a suspension supporting the magnetic head, the magnetic head including a slider substrate having a trailing edge and multiple bonding pads arranged on the trailing edge in a row, and the bonding pads being electrically connected to the suspension, wherein each of the bonding pads includes a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer.

A disk drive unit of the present invention contains an HGA, a drive arm attached to the HGA, a disk, and a spindle motor to spin the disk, the HGA contains a magnetic head and a suspension supporting the magnetic head, the magnetic head comprising a slider substrate having a trailing edge and multiple bonding pads arranged on the trailing edge in a row, and the bonding pads being electrically connected to the suspension. Each of the bonding pads contains a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer.

In comparison with the prior art, at least one solder nonwettable layer is adhered to the trailing edge and connected with at least one side of the seed layer, namely, at least one solder nonwettable layer is formed around the area of each soldering layer, thus adjacent bonding pads are not easy to happen bridging and shorting-circuit while soldering a solder ball between the soldering layer and a electrical connection pad on the suspension. Based on this design, the spacing between adjacent bonding pads can be shortened due to the existence of the solder nonwettable layer. Therefore, compared to the prior art, more bonding pads could be disposed at the trailing edge by compared with the conventional design, as a result, these additional bonding pads could be connected to some elements with specific functions, thereby more functions of the magnetic head can be extended, and the read and write performance of the magnetic head can be improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 4b is a partial enlarged view of the bonding pads shown in FIG. 4a;

FIG. 6b is a partial enlarged view of the bonding pads shown in FIG. 6a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the present invention is directed to a magnetic head, an HGA, a disk drive unit with the same, and a manufacturing method of a magnetic head, thereby obtaining simple and stable structure, and preventing the adjacent bonding pads bridging and shorting-circuit, finally improving the performance of the magnetic head.

Figure 2A:
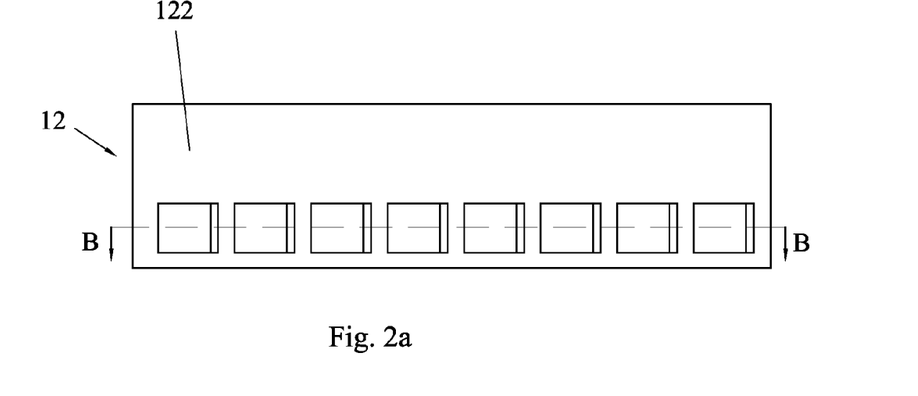
FIG. 2a is a schematic view of a magnetic head seen from the trailing edge of the present invention.
Figure 2B:
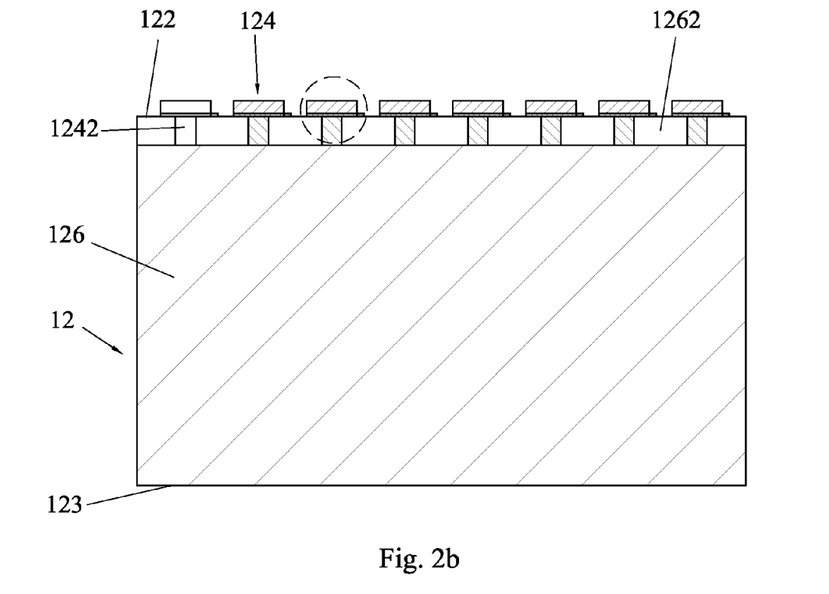
FIG. 2b is a cross-section view of the magnetic head along line B-B indicated in FIG. 2a according to a first embodiment of the present invention.

FIG. 2a and FIG. 2b show the detailed structure of a magnetic head according to the first embodiment of the present invention. As shown, the magnetic head 12 includes a slider substrate 126 having a trailing edge 122 and a leading edge 123 opposite to the trailing edge 122, and multiple bonding pads 124, such as eight, formed on a surface of the trailing edge 122 and arranged in a row and separated with a predetermined spacing, which are adapted for connected with the electrical connection pads on a suspension. Specifically, the slider substrate 126 further includes an over coat layer 1262 on which the trailing edge 122 is formed. A conductive column 1242, such as a copper column 1242 is embedded in the over coat 1262 and used for electrically connecting with the read/write element in the slider substrate 126 and the bonding pads 124 on the trailing edge 122.

Figure 3A:
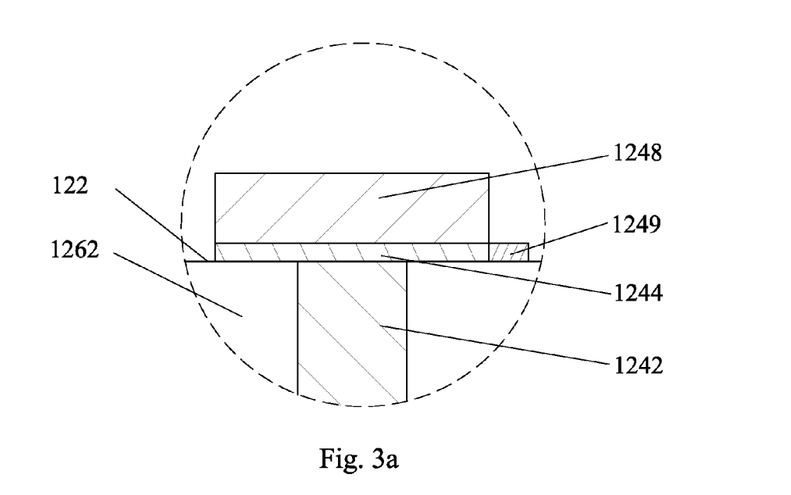
FIG. 3a is a partial enlarged view of the bonding pads shown in FIG. 2b according to a first embodiment.
Figure 7:
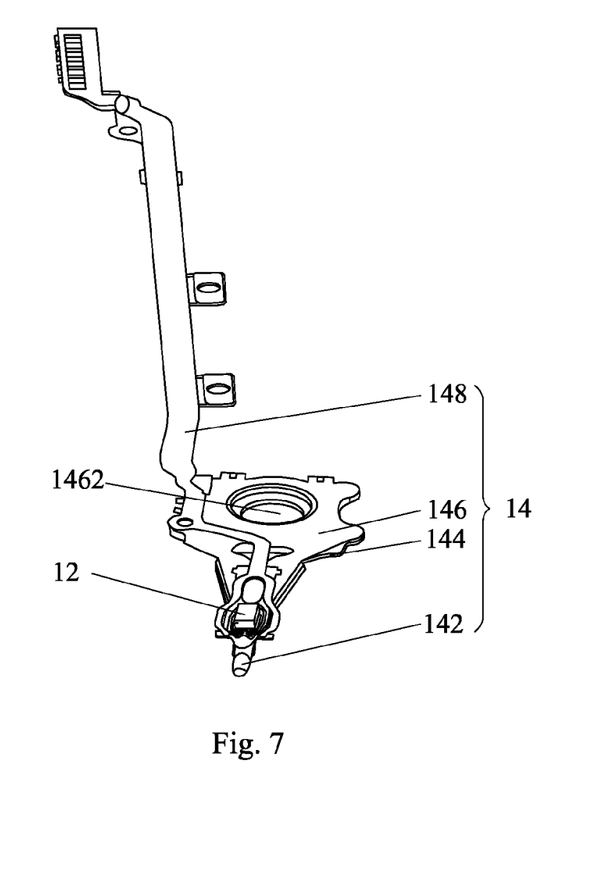
FIG. 7 is a perspective view of the HGA of the present invention.

According to one embodiment, as shown in FIG. 3a, each of the bonding pads 124 contains a seed layer 1244 adhered to the trailing edge 122, a soldering layer 1248 formed on the seed layer 1244, and a solder nonwettable layer 1249 adhered to the trailing edge 122 and connected with one side of the seed layer 1244. Concretely, the seed layer 1244 is electrically connected with the read/write element in the slider substrate 126 via the conductive column 1242, and the soldering layer 1248 is adapted for connecting with an electrical connection pad on the suspension 14 via a solder ball, as shown in FIG. 7 for example. As mentioned above, the solder nonwettable layer 1249 is adhered to the trailing edge 122 and connected with one side of the seed layer 1244, namely, each solder nonwettable layer 1249 is formed around the area of each soldering layer 1248, thus adjacent bonding pads 124 are not easy to happen bridging and shorting-circuit while soldering a solder ball between the soldering layer 1248 and a electrical connection pad on the suspension. Based on this design, the spacing between adjacent bonding pads 124 can be shortened due to the existence of the solder nonwettable layer 1249. Therefore, compared to the prior art, more bonding pads 124 could be disposed at the trailing edge 122 by compared with the conventional design, as a result, these additional bonding pads 124 could be connected to some elements with specific functions, thereby more functions of the magnetic head 12 can be extended, and the read and write performance of the magnetic head 12 can be improved.

Figure 3B:
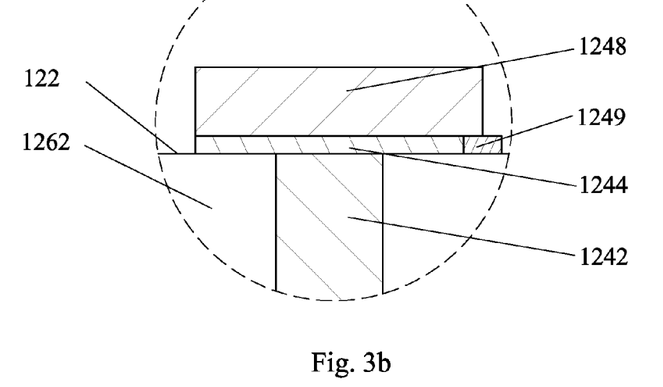
FIG. 3b is a partial enlarged view of the bonding pads according to a second embodiment.
Figure 3C:
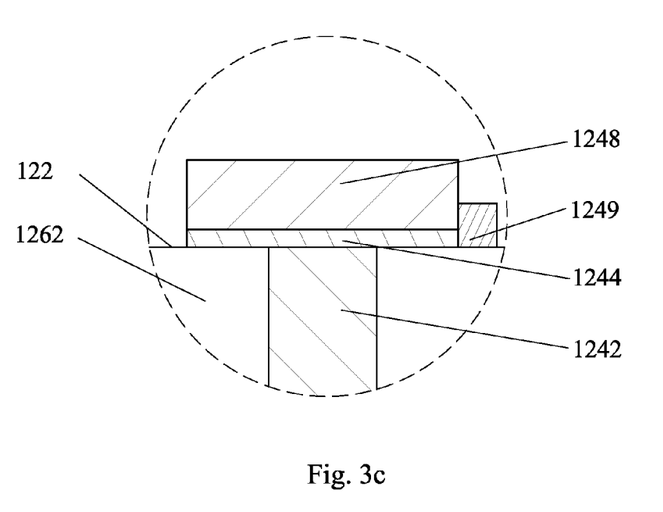
FIG. 3c is a partial enlarged view of the bonding pads according to a third embodiment.

In this embodiment, the seed layer 1244 has the same width with the soldering layer 1248, and the solder nonwettable layer 1249 has the same thickness with the seed layer 1244. Optionally, the seed layer 1244 could have a width smaller than that of the soldering layer 1248, as shown in FIG. 3b. Preferably, the solder nonwettable layer 1249 has a thickness larger than that of the seed layer 1244, as shown in the FIG. 3c. Of course, the solder nonwettable layer 1249 could have a thickness smaller than that of the seed layer 1244. In addition, the seed layer 1244 and the solder nonwettable layer 1249 could be formed integrally during production process for simplifying the structure and lowering production cost.

The solder nonwettable layer 1249 are made of material that solders are nonwettable, they include one or more material(s) selected from nickel, titanium, tantalum, aluminum, nickel alloy, titanium alloy, tantalum alloy, aluminum alloy, or Diamond-like Carbon (DLC), so the solder nonwettable layer 1249 can prevent adjacent bonding pads 124 bridging and shorting-circuit. Preferably, the seed layer 1244 can be made of material such as nickel, titanium, tantalum, aluminum, nickel alloy, titanium alloy, tantalum alloy, aluminum alloy, or DLC.

Figure 4A:
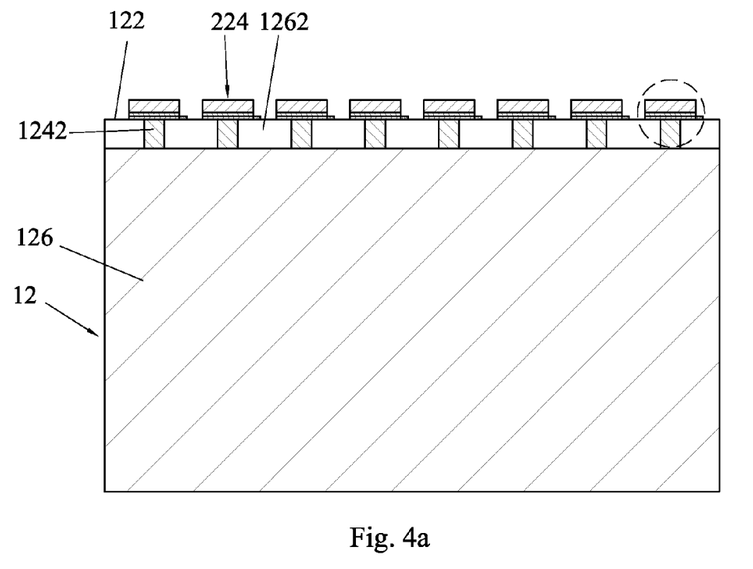
FIG. 4a is another cross-section view of the magnetic head along line B-B indicated in FIG. 2a according to the second embodiment of the present invention.
Figure 4B:
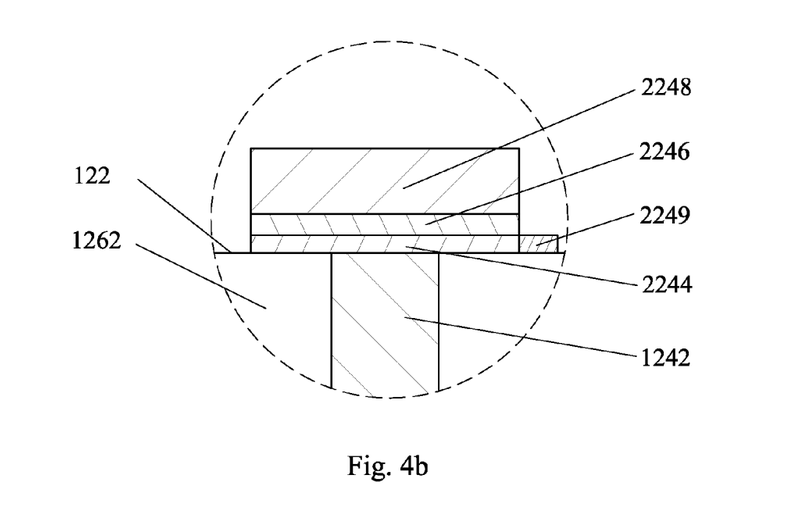

FIG. 4a and FIG. 4b show the detailed structure of the magnetic head according to the second embodiment of the present invention, this embodiment discloses a bonding pads 224 with structure similar to that of the bonding pads 124, the difference between them is only that the bonding pads 224 further contains an enhancing layer 2246 sandwiched between the seed layer 2244 and the soldering layer 2248. And the enhancing layer 2246 is also made by solder nonwettable material, such as nickel, titanium, tantalum, aluminum, nickel alloy, titanium alloy, tantalum alloy, aluminum alloy, or DLC. The structure of the bonding pads 224 is more stable and much stronger due to the enhancing layer 2246.

Figure 5A:
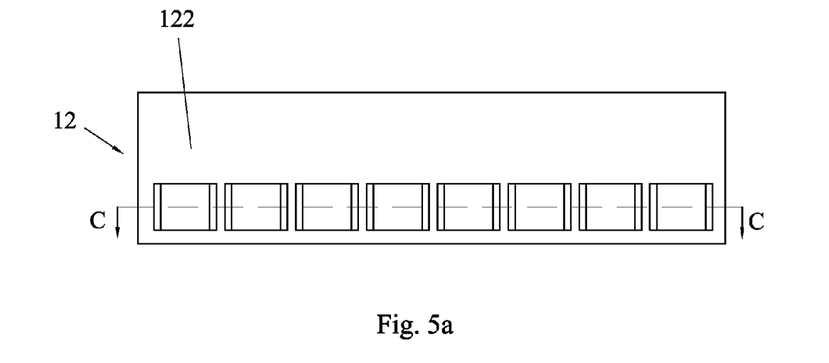
FIG. 5a is another schematic view of a magnetic head seen from the trailing edge of the present invention.
Figure 5B:
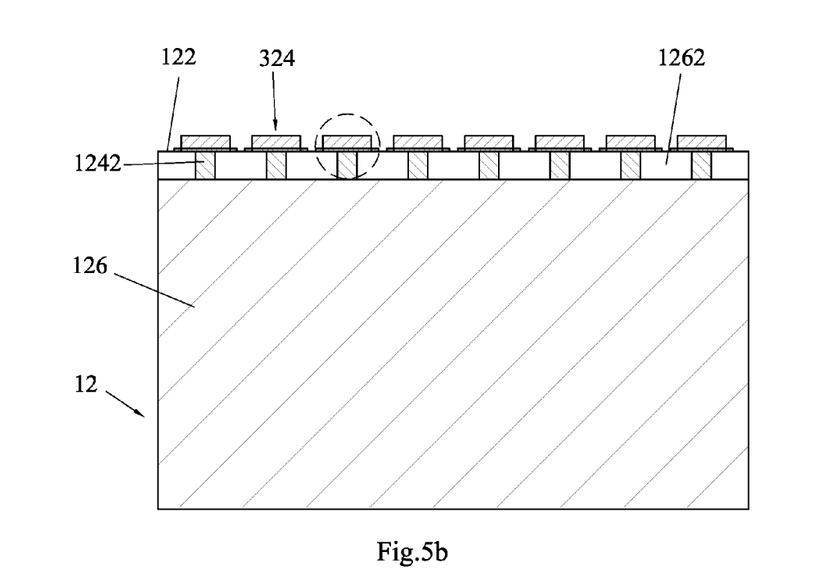
FIG. 5b is a cross-section view of the magnetic head along line C-C indicated in FIG. 5a according to the third embodiment of the present invention.
Figure 5C:
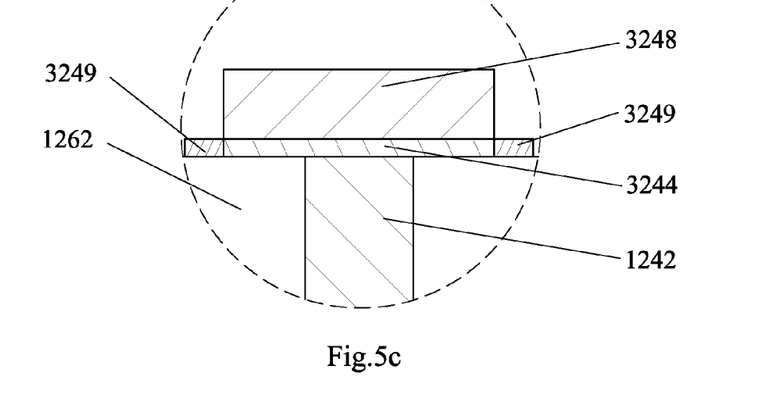
FIG. 5c is a partial enlarged view of the bonding pads shown in FIG. 5b.

FIGS. 5a-5c show the detailed structure of the magnetic head according to the third embodiment of the present invention. Differing from the first embodiment, the present embodiment has two solder nonwettable layers configured at two sides of each bonding pad 324. Similarly, the magnetic head 12 includes a slider substrate 126 having a trailing edge 122 and a leading edge 123 opposite to the trailing edge 122, and multiple bonding pads 324, such as eight, formed on a surface of the trailing edge 122 and arranged in a row. Each of the bonding pad 324 contains a seed layer 3244 adhered to the trailing edge 122 and electrically connected with the slider substrate 126, a soldering layer 3248 formed on the seed layer 3244 and adapted for connecting with a suspension 14, and two solder nonwettable layers 3249 adhered to the trailing edge 122 and connected with two sides of the seed layer 3244. That is, there are two solder nonwettable layers 3249 around the area of each bonding pad 324. Compared with the above embodiments with one solder nonwettable layer on one side of the soldering layer, the present embodiment ensures a further protection for prevent adjacent bonding pads 324 from bridging and shorting-circuit.

Figure 6A:
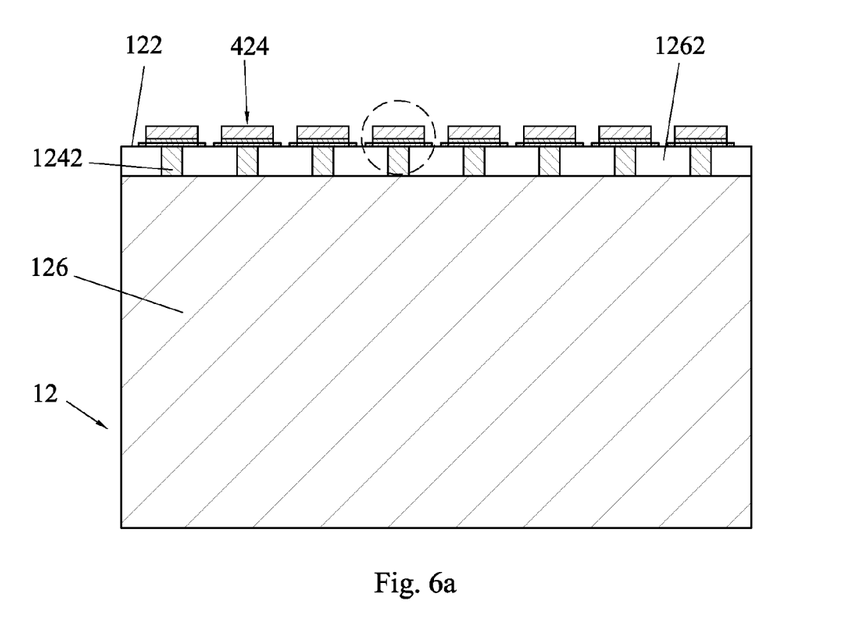
FIG. 6a is another cross-section view of the magnetic head along line C-C indicated in FIG. 5a according to the fourth embodiment of the present invention.
Figure 6B:
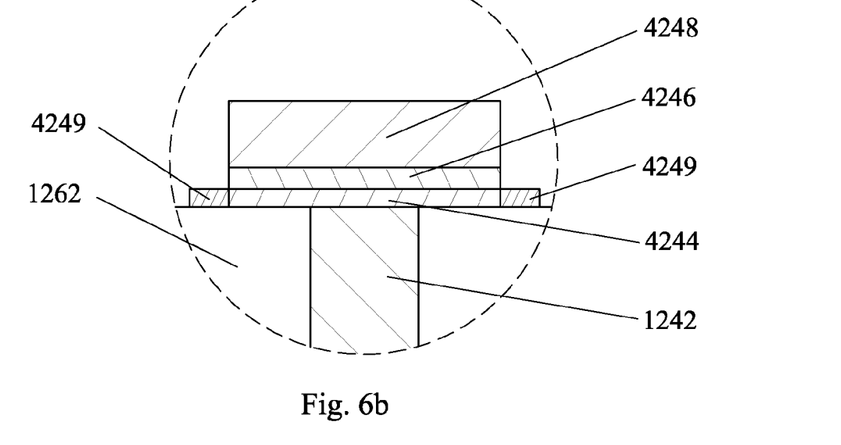

FIG. 6a and FIG. 6b show a revised embodiment basing on the third embodiment described above. The structure of the bonding pads 424 is similar to that of the bonding pads 324 basically, except that, the bonding pads 424 further includes an enhancing layer 4246 sandwiched between the seed layer 4244 and the soldering layer 4248. And the enhancing layer 4246 is also made by solder nonwettable material, such as nickel, titanium, tantalum, aluminum, nickel alloy, titanium alloy, tantalum alloy, aluminum alloy, or DLC. The structure of the bonding pads 424 is more stable and much stronger due to the enhancing layer 4246.

FIG. 7 illustrates an HGA 10 according to one embodiment of the present invention. The HGA 10 contains a magnetic head 12 and a suspension 14 for supporting the magnetic head 12. The suspension 14 includes a load beam 142, a base plate 144, a hinge 146 and the flexure 148, all of which are assembled with each other. The hinge 146 has a mounting hole 1462 formed thereon to assemble the hinge 146 to the base plate 144. The flexure 148 includes a suspension tongue, and the magnetic head 12 is carried on the suspension tongue. Multiple electrical connection pads are arranged on the suspension tongue for connecting with the bonding pads 124, 224, 324, 424 of the magnetic head 12. Based on the configuration of the bonding pads 124, 224, 324, 424 of the magnetic head 12 described above, the solder nonwettable layer can prevent adjacent bonding pads 124, 224, 324, 424 from bridging and shorting-circuit.

Figure 8:
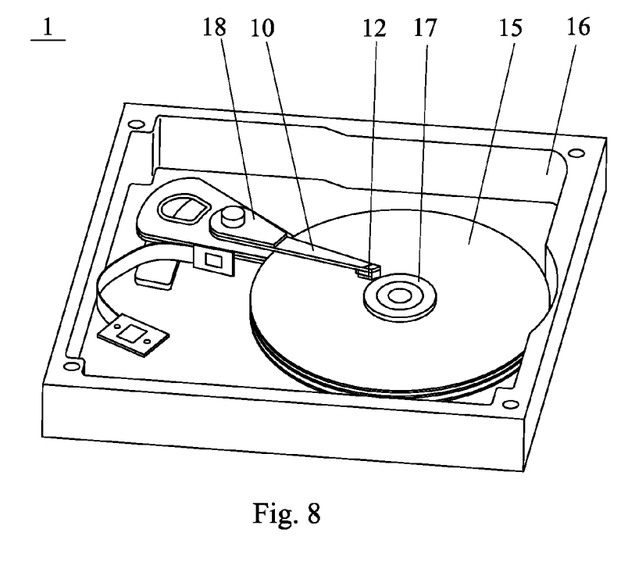
FIG. 8 is a perspective view of the disk drive unit of the present invention.

FIG. 8 illustrates a disk drive unit 1 according to an embodiment of the present invention. The disk drive unit 1 includes an HGA 10, a drive arm 18 connected to the HGA 10, a rotatable disk 15, and a spindle motor 17 to spin the disk 15, all of which are mounted in a housing 16. The HGA 10 includes a suspension 14 and a magnetic head 12 as mentioned above. The structure and assembling of the disk drive unit 1 are well known by general technician in the art, so the detail of its structure and assembling will be omitted hereby.

Figure 9:
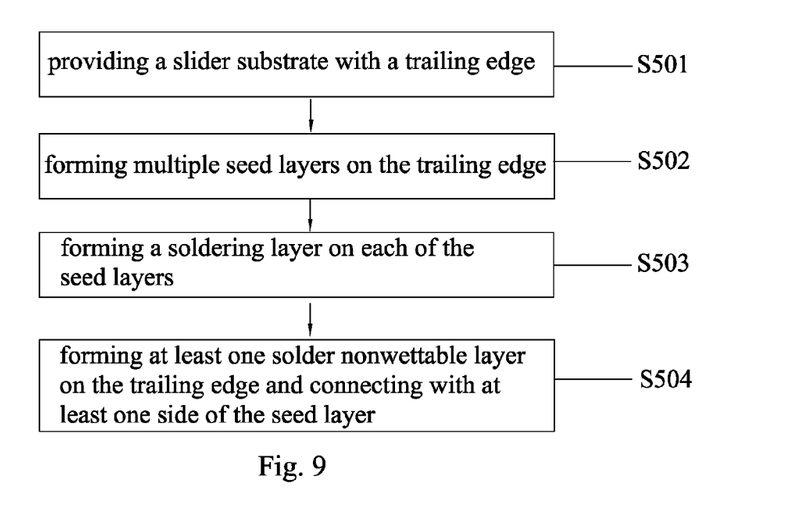
FIG. 9 illustrates a flowchart view of a manufacturing method for forming bonding pads on a slider substrate of the present invention.

FIG. 9 shows a flowchart of a manufacturing method for forming bonding pads on a slider substrate of the present invention, the method includes steps of:

Step 501, providing a slider substrate with a trailing edge;
Step 502, forming multiple seed layers on the trailing edge;
Step 503, forming a soldering layer on each of the seed layers; and
Step 504, forming at least one solder nonwettable layer on the trailing edge and connecting with at least one side of the seed layer.

Preferably, the seed layer has the same width with the soldering layer.

Preferably, the solder nonwettable layer has the same thickness with the seed layer.

Preferably, the solder nonwettable layer has a thickness larger than that of the seed layer.

Preferably, the manufacturing method further includes forming an enhancing layer sandwiched between the seed layer and the soldering layer.

Preferably, the seed layer and the solder nonwettable layer are formed integrally.

Preferably, a first solder nonwettable layer and a second solder nonwettable layer are connected with two sides of the seed layer respectively.

Preferably, the seed layer comprises one or more material(s) selected from nickel, titanium, tantalum, aluminum, nickel alloy, titanium alloy, tantalum alloy, aluminum alloy, or DLC.

Preferably, the solder nonwettable layer comprises one or more material(s) selected from nickel, titanium, tantalum, aluminum, nickel alloy, titanium alloy, tantalum alloy, aluminum alloy, or DLC.

Preferably, the enhancing layer comprises one or more material(s) selected from nickel, titanium, tantalum, aluminum, nickel alloy, titanium alloy, tantalum alloy, aluminum alloy, or DLC.

Preferably, at least eight bonding pads are arranged on the trailing edge.

Referring to the manufacturing method described above, the step of forming the solder nonwettable layer can be any step behind the step of forming the seed layer.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A magnetic head, comprising a slider substrate having a trailing edge and multiple bonding pads arranged on the trailing edge in a row;
wherein each of the bonding pads comprises a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer, wherein the solder nonwettable layer has the same thickness with the seed layer, so that their top surfaces are in the same level.

2. The magnetic head according to claim 1, wherein the seed layer has the same width with the soldering layer.

3. The magnetic head according to claim 1, wherein the slider substrate further comprises an over coat layer having the trailing edge, and the seed layer electrically connects with a conductive column embedded in the over coat layer.

4. The magnetic head according to claim 1, wherein each of the bonding pads further comprises an enhancing layer sandwiched between the seed layer and the soldering layer.

5. The magnetic head according to claim 4, wherein the enhancing layer comprises one or more material(s) selected from nickel, titanium, tantalum, aluminum, nickel alloy, titanium alloy, tantalum alloy, aluminum alloy, or Diamond-like Carbon.

6. The magnetic head according to claim 1, wherein the seed layer and the solder nonwettable layer are formed integrally.

7. The magnetic head according to claim 1, wherein a first solder nonwettable layer and a second solder nonwettable layer are connected with two sides of the seed layer respectively.

8. The magnetic head according to claim 1, wherein the seed layer comprises one or more material(s) selected from nickel, titanium, tantalum, aluminum, nickel alloy, titanium alloy, tantalum alloy, aluminum alloy, or Diamond-like Carbon.

9. The magnetic head according to claim 1, wherein the solder nonwettable layer comprises one or more material(s) selected from nickel, titanium, tantalum, aluminum, nickel alloy, titanium alloy, tantalum alloy, aluminum alloy, or Diamond-like Carbon.

10. The magnetic head according to claim 1, wherein at least eight bonding pads are arranged on the trailing edge.

11. A manufacturing method for forming bonding pads on a slider substrate, comprising steps of:
providing a slider substrate with a trailing edge;
forming multiple seed layers on the trailing edge in a row;
forming a soldering layer on each of the seed layers; and
forming at least one solder nonwettable layer on the trailing edge and connecting with at least one side of the seed layer, wherein the solder nonwettable layer has the same thickness with the seed layer, so that their top surfaces are in the same level.

12. The manufacturing method according to claim 11, wherein the seed layer has the same width with the soldering layer.

13. The manufacturing method according to claim 11, further comprising forming an enhancing layer sandwiched between the seed layer and the soldering layer.

14. The manufacturing method according to claim 13, wherein the enhancing layer comprises one or more material(s) selected from nickel, titanium, tantalum, aluminum, nickel alloy, titanium alloy, tantalum alloy, aluminum alloy, or Diamond-like Carbon.

15. The manufacturing method according to claim 11, wherein the seed layer and the solder nonwettable layer are formed integrally.

16. The manufacturing method according to claim 11, wherein a first solder nonwettable layer and a second solder nonwettable layer are connected with two sides of the seed layer respectively.

17. The manufacturing method according to claim 11, wherein the seed layer comprises one or more material(s) selected from nickel, titanium, tantalum, aluminum, nickel alloy, titanium alloy, tantalum alloy, aluminum alloy, or Diamond-like Carbon.

18. The manufacturing method according to claim 11, wherein the solder nonwettable layer comprises one or more material(s) selected from nickel, titanium, tantalum, aluminum, nickel alloy, titanium alloy, tantalum alloy, aluminum alloy, or Diamond-like Carbon.

19. The manufacturing method according to claim 11, wherein at least eight bonding pads are arranged on the trailing edge.

20. A head gimbal assembly, comprising a magnetic head and a suspension supporting the magnetic head, the magnetic head comprising a slider substrate having a trailing edge and multiple bonding pads arranged on the trailing edge in a row, and the bonding pads being electrically connected to the suspension;

wherein each of the bonding pads comprises a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer, wherein the solder nonwettable layer has the same thickness with the seed layer, so that their top surfaces are in the same level.

21. A disk drive unit, comprising a head gimbal assembly, a drive arm attached to the head gimbal assembly, a disk, and a spindle motor to spin the disk, the head gimbal assembly comprising a magnetic head and a suspension supporting the magnetic head, the magnetic head comprising a slider substrate having a trailing edge and multiple bonding pads arranged on the trailing edge in a row, and the bonding pads being electrically connected to the suspension;

wherein each of the bonding pads comprises a seed layer adhered to the trailing edge and electrically connected with the slider substrate, a soldering layer formed on the seed layer and adapted for connecting with a suspension, and at least one solder nonwettable layer adhered to the trailing edge and connected with at least one side of the seed layer, wherein the solder nonwettable layer has the same thickness with the seed layer, so that their top surfaces are in the same level.

\* \* \* \* \*